Figure 1:
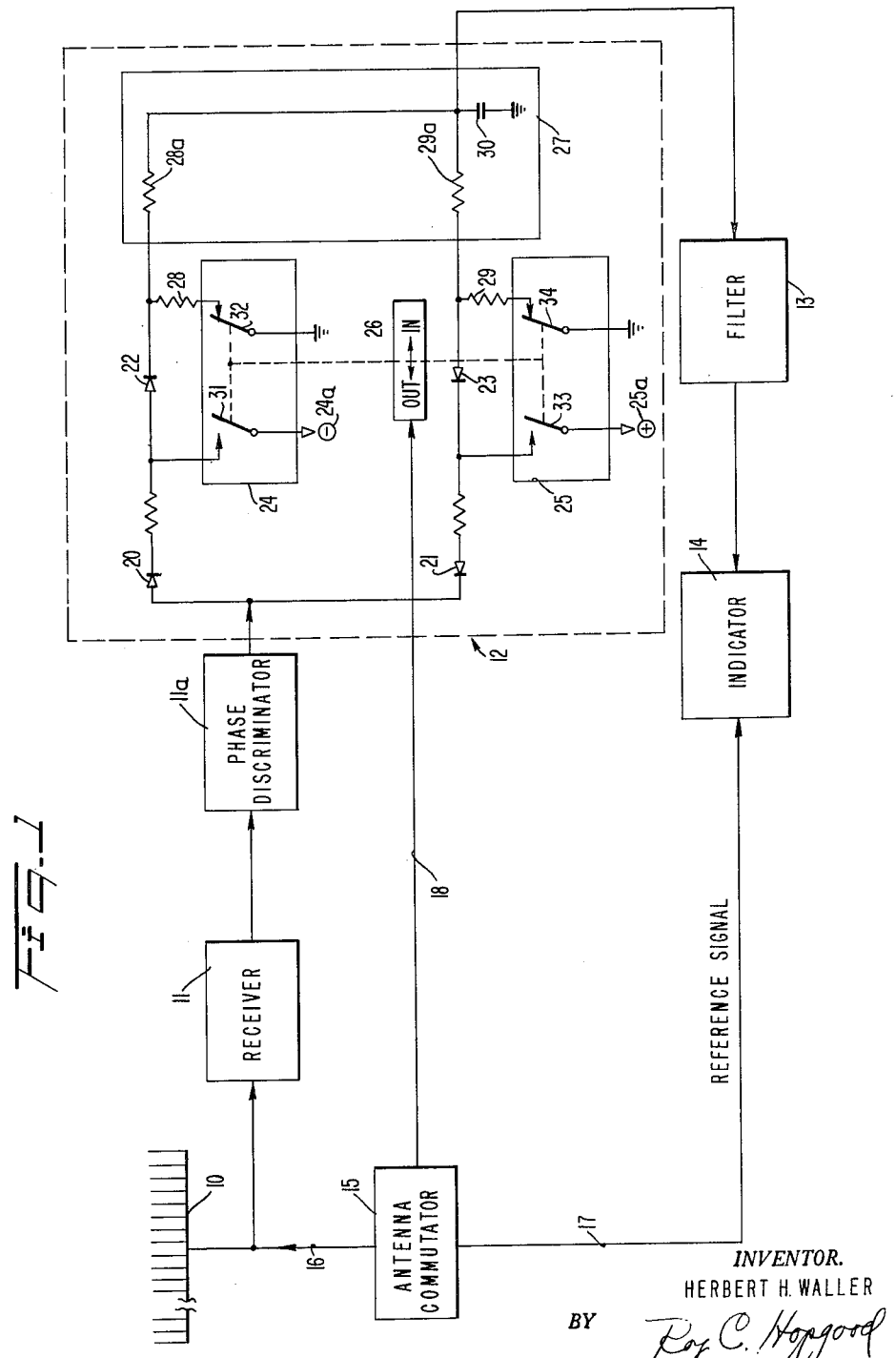

Sept. 18, 1962          H. H. WALLER          3,055,002
                    GATED INTEGRATING CIRCUIT
Filed Oct. 6, 1960                         2 Sheets-Sheet 2

INVENTOR.
HERBERT H. WALLER
BY
Roy C. Hopgood
ATTORNEY

United States Patent Office

3,055,002
Patented Sept. 18, 1962

3,055,002
GATED INTEGRATING CIRCUIT
Herbert H. Waller, Hicksville, N.Y., assignor to Servo Corporation of America, Hicksville, N.Y., a corporation of New York
Filed Oct. 6, 1960, Ser. No. 60,926
8 Claims. (Cl. 343—113)

This invention relates to a quasi-Doppler direction finding system and, more specifically, to a gated integrating circuit utilized in the data extractor portion of the system for developing a bearing oriented signal.

The bearing of a remote object, such as an air vehicle, with respect to a tracking station may be obtained by utilizing a quasi-Doppler direction finding system having a circuit arrangement for extracting bearing data. An example of such a system is found in copending application Serial No. 56,598 filed September 16, 1960 in the name of Paul G. Hansel entitled Radiosonde and Tracking System.

In a quasi-Doppler system, the rotating antenna, generally employed in a true Doppler system, is simulated by an array of fixed antennas which are commutated in succession to obtain bearing data as a phase indication of the signal detected at each antenna. These signals are coupled to a phase discriminator circuit to produce a series of spike pulses. Each pulse represents the rate of phase change of the bearing signal detected by an antenna and, therefore, the pulses must be integrated to provide a direct bearing oriented waveform for comparison with a reference "north" signal to obtain the bearing of the remote object.

While it is theoretically possible to utilize a phase discriminator circuit which provides a bearing oriented waveform as a direct output, there is no practical circuit for readily permitting this operation to be performed, and, therefore, a phase discriminator is employed which produces a pulse output, as described. The pulses are separated by intervals of time during which no desirable information appears. However, during these intervals, the discriminator circuit produces noise impulses which are integrated along with the information pulses providing a false indication of the object bearing to be compared with the reference condition.

Accordingly, it is an object of the invention to provide an integrating circuit which is employed as a part of the data extractor portion of a quasi-Doppler direction finding system to obtain a bearing oriented waveform from the bearing data detected by a quasi-Doppler antenna array.

Another object of the invention is to provide an integrating circuit which gates the bearing data detected by a quasi-Doppler antenna array to improve the signal-to-noise ratio of a bearing oriented waveform.

A further object of the invention is to provide a quasi-Doppler direction finding system employing a gated integrating circuit for obtaining the bearing of a remote object with respect to a tracking station.

In accordance with an aspect of the invention, there is provided a circuit for integrating a series of information bearing pulses from a source; the pulses being separated from adjacent pulses by predetermined intervals of time. Control means block conduction from the source to the integrating means in response to a bias voltage. In addition, a semiconductor switch arrangement is provided which responds to gating pulses applied in time coincidence with the time intervals between the information pulses, to switch the bias voltage to the control means thereby blocking conduction to the integrating means during the periods between the information pulses.

Figure 2:
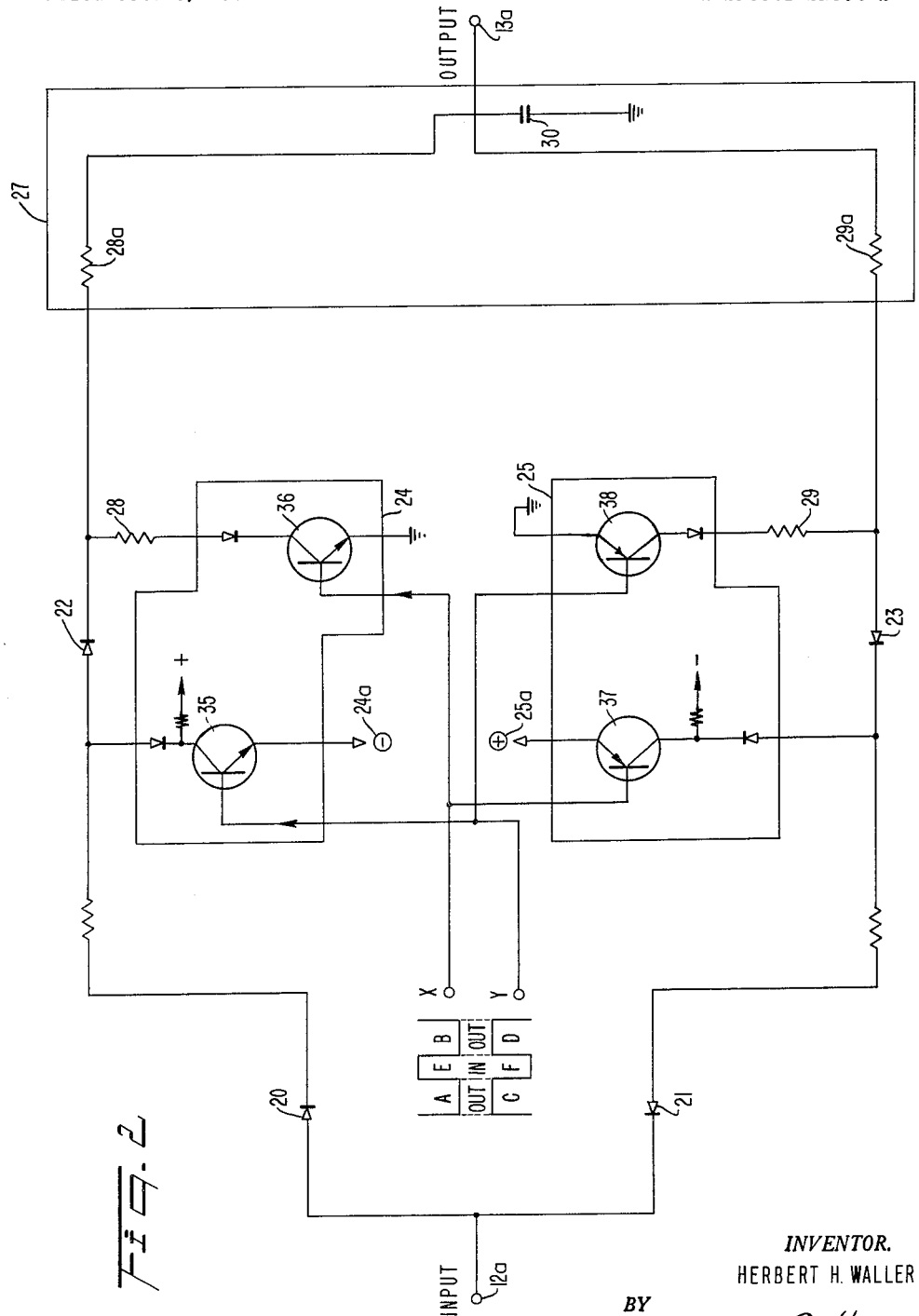

The above-mentioned and other features and objects of this invention and the manner of attaining them will become more apparent and the invention itself will be best understood by reference to the following description of an embodiment of the invention taken in conjunction with the accompanying drawing wherein:

FIG. 1 is a schematic diagram of a quasi-Doppler direction finding system employing a gated integrating circuit which is shown for simplicity as a simple switching circuit; and, FIG. 2 is a schematic diagram of the gated integrating circuit of the invention.

Referring now to FIG. 1, a quasi-Doppler direction finding system utilizing the novel circuit comprises an antenna array 10 having a plurality of fixed antennas for detecting a remote object. The antennas are commutated in succession by an antenna commutator 15 over the line 16. A signal is received and detected in succession by receiver 11 from each antenna of the array 10. The detected output of receiver 11 is coupled to a phase discriminator circuit 11a which provides an output comprising a series of pulses separated by predetermined intervals of time; the intervals corresponding to the time between the successive antenna commutations. The amplitude of each pulse is proportional to the rate of phase change of the detected signal commutated successively from each antenna.

The discriminator circuit 11a is coupled to an integrating circuit, generally indicated at 12, for integrating the pulses to provide a detected waveform. This waveform is filtered at 13 and then applied to a bearing indicator 14. The filter 13 passes a signal having a frequency of 200 cycles per second; this frequency corresponding to the scanning frequency of the antenna array 10. Simultaneously, a reference "north" signal, having a frequency of 200 cycles per second, is applied from the antenna commutator 15 over the line 17 to the indicator 14 for phase comparison with the detected waveform to indicate the bearing of the detected remote object.

As previously mentioned, the phase discriminator circuit 11a provides an output comprising a series of information pulses separated by intervals of time during which no desirable information appears. However, during these intervals the phase discriminator circuit produces noise impulses which are also applied to the integrating circuit 12. Since the output waveform of the integrating circuit contains these impulses in integrated form, and thus provides a false bearing oriented signal, an arrangement is provided in the integrating circuit of the invention for gating the circuit during these intervals to block conduction.

Referring more specifically to the integrating circuit 12, the diodes 20 and 21 separate the information pulses applied by the discriminator circuit 11a into pulses of positive and negative polarity, respectively. The positive and negative pulses are applied to an integrator, generally indicated at 27 and comprising resistors 28a, 29a and capacitor 30. The diodes 22, 23 are normally conducting, but are biased to block conduction to the integrating circuit 27 during the time intervals between the information pulses. During these intervals, a bias voltage is applied from the voltage supplies 24a—25a to the diodes 22—23, respectively, by simple switching circuits indicated in simplified diagrammatic form at 24 and 25, respectively. The switching circuits 24—25 are controlled by a control switch 26, which in its simplest form may be a relay coil controlling contacts 31–34, to be in either a gated "in" position, corresponding to the time when information pulses are applied or, a gated "out" position, corresponding to the time between these pulses. This switch is operable in response to a signal from the antenna commutator 15 over the line 18.

Each switching circuit 24—25 is provided with a pair of contact arms 31—32 and 33—34, respectively, which operate with fixed contacts. During the interval between two information pulses, the switches are set in the gated "out" position by the signal from the antenna commutator 15. In this position, the arm 31 connects the diode 22 to the negative bias supply 24a back biasing the diode to prevent conduction, and the contact arm 32 is open circuited to ground. Similarly, the contact arm 33 of the switch 25 connects the positive bias supply 25a to the diode 23 blocking conduction through it, and the contact arm 34 is open circuited to ground. When the diodes 22 and 23 are back biased any noise impulses present between the two information bearing pulses, are blocked from the integrator 27.

However, when the switching control 26 is connected in the gated "in" position, the information bearing pulses are applied to the integrating circuit 12. The contact arms 31 and 33 are open circuited removing the bias voltages from the diodes 22 and 23, and the contact arms 32 and 34 connect the resistors 28 and 29 into the integrating circuit. The resistors 28 and 29 are considerably smaller in ohmic value than the resistors 28a and 29a of the integrator 27 to prevent peak charging of the capacitor 30. Since a stepped waveform is desired as the output of the integrating circuit 12, provision is made for preventing any back leakage from the capacitor 30 through the diodes 22—23 during the gated "out" portion of the circuit operation. This is accomplished by maintaining the value of the bias applied to the diodes 22—23 during the gated "out" periods at a level sufficient to prevent a reverse current flow.

Referring to FIG. 2, for a practical version of the circuit of the invention, the simple switching elements of the switches 24—25 of FIG. 1 are replaced by transistorized switches. In this circuit the transistors 35 and 36 are of the NPN type and the transistors 37 and 38 are of the PNP type. A transistor of the NPN type conventionally is made conducting when a positive pulse is applied to its base electrode and a PNP transistor is made conducting by application of a negative pulse to its base. The transistors 35 and 37 are connected, through their collector electrodes, to the diodes 22—23, respectively, and perform the function of the contact arms 31 and 33, respectively, of the embodiment of FIG. 1, by connecting the bias voltages from the supplies 24a—25a to the diodes 22—23. The transistors 36 and 38 similarly perform the function of the contact arms 32 and 34, respectively, of the embodiment of FIG. 1 by switching the resistors 28—29 into the integrator 27.

The emitters of the transistors 35, 37 are connected to the bias supplies 24a—25a, respectively, and the emitters of transistors 36, 38 are each connected to ground. The base of each transistor is coupled to a source of gating pulses. As shown, the gating pulses are applied as two separate trains of alternating positive and negative pulses. The corresponding pulses of each train are of opposite polarity and are applied to the terminals X and Y. For example, the pulses indicated by the reference letters A and B are negative pulses which are applied to a terminal X to be applied to the bases of the transistors 36 and 37 during successive gated "out" periods. Between these two pulses a positive pulse E is applied to this terminal during the gated "in" period. Similarly, the pulses C and D are of positive polarity and are applied to the terminal Y to be applied to the bases of the transistors 35 and 38 during successive gated "out" periods. Between these periods, i.e. during the gated "in" period, a negative pulse F is applied to the terminal Y.

In operation, application of the negative pulse A to the base of the transistor 37 causes the transistor to conduct. The positive bias supply 25a connected to the emitter of this transistor is then coupled to the diode 23 back biasing it to block conduction to the integrator 27. The application of pulse A to the base of the transistor 36 renders it nonconducting. Similarly, the application of the positive pulse C to the base electrode of the transistor 38 causes it to be nonconducting. When pulse C is applied to the base electrode of transistor 35, the transistor conducts coupling the negative bias supply 24a to the diode 22 back biasing it to block conduction to the integrator 27. As just described, the integrating circuit is operating in the gated "out" mode corresponding to the period between two information pulses. Thus, noise impulses are blocked from being conducted to the integrator 27.

The information pulses are applied to the input terminal 12a and, as previously stated, are separated into pulses of positive and negative polarity by the diodes 20—21, respectively, enabling the diodes 22—23 to pass these pulses to the integrator 27. When the gated "in" pulses E and F are applied to their terminals X and Y, they are applied in time coincidence with the application of an information bearing pulse. The transistor 37 is cut-off and the transistor 36 conducts, to connect the resistor 28 into the integrator 27, when the positive pulse E is applied to their respective base electrodes. Simultaneously, the negative pulse F is applied to the transistor 35 to render it non-conducting and to transistor 38 to render it conducting to connect the resistor 29 into the integrator 27. In this mode of operation, the bias voltages are removed from the diodes 22—23 permitting them to conduct.

It is obvious, therefore, that the transistors 35 and 37 perform the function of gating during the intervals of time between information bearing pulses to prevent the passage of noise impulses to the integrator 27. The integrator 27 provides a stepped waveform output at the terminal 13a, since the bias voltages applied to the diodes 22—23 are at a level sufficient to prevent a reverse current flow from the capacitor 30. The stepped waveform has an improved signal-to-noise ratio that is more accurate for comparison with a reference "north" signal.

While the foregoing description sets forth the principles of the invention in connection with the specific apparatus, it is to be understood that this description is made only by way of example and not as a limitation of the scope of the invention as set forth in the objects thereof and in the accompanying claims.

What is claimed is:

1. An integrating circuit, comprising a source of input pulses, each pulse being separated from the next succeeding one by a predetermined period of time, means for integrating said pulses to provide a waveform output, and means for controlling conduction of pulses from said source to the integrating means, the conduction controlling means being characterized by a source of bias voltage, means for blocking conduction from said source to said integrating means when biased by said bias voltage, a source of gating pulses of one polarity, each gating pulse being in time coincidence with one of said predetermined periods of time, and semiconductor switch means responsive to the polarity of said gating pulses to conduct thereby switching the bias voltage to the blocking means.

2. The circuit according to claim 1, wherein said integrating means comprises a resistive portion and a capacitive portion; and said circuit also comprises resistor means for preventing peak charging of said capacitive portion, and a second semiconductor switch for connecting said resistor means into said circuit, said gating pulses being of continuous alternating polarity, the pulses of one polarity being in time coincidence with the periods between said input pulses and the pulses of the opposite polarity being in time coincidence with said input pulses, said semiconductor switch responding to the pulses of the first polarity and said second semiconductor switch responding to the pulses of the opposite polarity to conduct connecting said resistor means into said circuit.

3. The circuit according to claim 1, and also comprising means for separating said input pulses into pulses of a first polarity and pulses of the opposite polarity; said conduction controlling means being further characterized by said source of bias voltage including, a first bias voltage of one polarity and a second bias voltage of the opposite polarity; said blocking means including, a first element for blocking conduction of said pulses of a first polarity and a second element for blocking said pulses of the opposite polarity, said first and second elements blocking said pulses when biased by said first and second bias voltages, respectively; said source of gating pulses including, a first train of gating pulses of one polarity, and a second train of gating pulses of the opposite polarity, said trains of gating pulses being in time coincidence with the periods between said input pulses; and said switch means including, a first semiconductor switch responsive to said first train of gating pulses to conduct switching said first bias voltage to said first blocking element and a second semiconductor switch responsive to said second train of gating pulses to conduct switching said second bias voltage to said second blocking element.

4. The circuit according to claim 3, wherein said first train of gating pulses is of positive polarity and said second train of gating pulses is of negative polarity, and said first and second switches are NPN and PNP transistors, respectively, each of said transistors having base, emitter and collector electrodes, said collectors being coupled to said blocking elements, respectively, said emitters to said bias voltages respectively, and said NPN and PNP transistor bases being responsive to the positive and negative polarity pulses, respectively, for the transistors to conduct switching said first and second bias voltages to said first and second blocking elements, respectively.

5. The circuit according to claim 3, wherein said bias voltages are of a value sufficient to prevent a reverse current flow from the integrating means when applied to said blocking elements during the intervals between said input pulses.

6. The circuit according to claim 3, wherein said integrating means comprises a resistive portion and a capacitive portion; and said circuit also comprises first and second resistor means for preventing peak charging of said capacitive portion, and third and fourth semiconductor switches for connecting said first and second resistor means, respectively, into said circuit, said first and second trains of gating pulses being of a continuous alternating polarity, the pulses of one polarity in said first train and the pulses of the opposite polarity in said second train being in time coincidence with said input pulses and the pulses of the opposite polarities in said first and second trains being in time coincidence with the intervals between said input pulses, said third and fourth semiconductor switches responding to the pulses of said second and first trains, respectively, that are coincident with said input pulses, to conduct connecting said resistor means into said circuit.

7. A quasi-Doppler direction finding system comprising an antenna array having a plurality of fixed antennas, means for commutating each of said antennas in succession to detect a signal from a remote object, means for receiving the detected signals, means for phase discriminating said detected signals to provide a series of output pulses, each pulse being separated from the next succeeding one by a predetermined period of time, means for integrating said output pulses to provide a stepped waveform, a bearing indicator coupled to the integrating means, and means for coupling a reference "north" signal from the commutating means to said indication, said stepped waveform and said reference signal being phase compared to indicate the bearing of said object, said integrating means being characterized by an integrator for integrating said pulses, and means for controlling conduction from the discriminating means to the integrator, including, a source of bias voltage, means for blocking conduction from said discriminating means when biased by said bias voltage, a source of gating pulses in time coincidence with said predetermined periods of time, and semiconductor switch means responsive to said gating pulses to conduct thereby switching the bias voltage to the blocking means.

8. The system according to claim 7, wherein said integrator comprises a resistive portion and a capacitive portion; and said integrating means also includes resistor means for preventing peak charging of said capacitive portion, and a second semiconductor switch for connecting said resistor means into said circuit, said gating pulses being of continuous alternating polarity, the pulses of one polarity being in time coincidence with the periods between the discriminating means output pulses and the pulses of the other polarity being in time coincidence with said discriminating means output pulses, said semiconductor switch responding to the pulses of one polarity and said second semiconductor switch responding to the pulses of the other polarity to conduct connecting said resistor means into said circuit.

References Cited in the file of this patent
UNITED STATES PATENTS
2,710,915    Young  ---------------- June 14, 1955